United States Patent
Moore

(10) Patent No.: US 6,526,689 B2
(45) Date of Patent: Mar. 4, 2003

(54) PLUG FOR ICE HOLE FISHING

(76) Inventor: Kerry B. Moore, 15405 Burt St., Omaha, NE (US) 68154

( * ) Notice: Subject to any disclaimer, the term of this patent is extended or adjusted under 35 U.S.C. 154(b) by 0 days.

(21) Appl. No.: 09/781,726

(22) Filed: Feb. 12, 2001

(65) Prior Publication Data

US 2002/0108290 A1 Aug. 15, 2002

(51) Int. Cl.$^7$ ............................................... A01K 97/01
(52) U.S. Cl. ........................................................... 43/4
(58) Field of Search .................... 43/4; 138/89; 405/68, 405/69

(56) References Cited

U.S. PATENT DOCUMENTS

| | | | | |
|---|---|---|---|---|
| 2,155,491 A | * | 4/1939 | Jacobs | 138/89 |
| 2,245,887 A | * | 6/1941 | Wikander | 4/295 |
| 2,799,146 A | * | 7/1957 | Meagher | 43/4 |
| 2,838,196 A | * | 6/1958 | Chapman | 220/1 |
| 2,955,805 A | * | 10/1960 | Jones, Jr. et al. | 43/4 |
| 3,466,781 A | * | 9/1969 | Nelson et al. | 43/4 |
| 3,667,640 A | * | 6/1972 | Morrow | 220/235 |
| 3,813,891 A | | 6/1974 | Wootten | 62/56 |
| 3,999,322 A | | 12/1976 | Kooker | 43/4 |
| 4,438,757 A | * | 3/1984 | Anderson | 126/300 R |
| 4,761,909 A | | 8/1988 | Christian et al. | 43/4 |
| 4,845,875 A | * | 7/1989 | Norwick | 43/4 |
| 4,910,906 A | * | 3/1990 | Schefers et al. | 43/4 |
| 5,927,000 A | * | 7/1999 | Bordes, Jr. | 43/124 |

* cited by examiner

*Primary Examiner*—Kurt Rowan
(74) *Attorney, Agent, or Firm*—Thomte, Mazour & Niebergall; Dennis L. Thomte

(57) ABSTRACT

An ice hole fishing plug comprising an elongated cylindrical member which is constructed of a closed cell compressible foam material. An upper plate is positioned on the upper end of the cylindrical member and a lower plate is positioned on the lower end of the cylindrical member. An elongated rod extends downwardly through the upper plate, the cylindrical member and the lower plate with the lower end of the elongated rod being secured to the lower plate. A nut is threadably secured to the upper end of the elongated rod above the upper plate. When the nut is threaded down on the rod, the cylindrical member 16 is compressed between the upper and lower plates to cause the cylindrical member 16 to expand radially outwardly into engagement with the side walls of the ice fishing hole. An actuator is also provided for conveniently threading and unthreading the nut at the upper end of the elongated rod. A protective cap having a flag member is also provided and may be mounted on the upper end of the plug when the plug is mounted in the ice hole.

2 Claims, 6 Drawing Sheets

PLUG FOR ICE HOLE FISHING

BACKGROUND OF THE INVENTION

1. Field of Invention

This invention relates to an ice hole fishing plug and more particularly to an improved ice hole fishing plug which prevents the ice hole from freezing during periods of non-use.

2. Description of the Related Art

Ice fishing is an extremely popular winter sport. In most cases, the fisherman (both male and female) drills a cylindrical hole in the ice by means of an ice auger or the like. Drilling of the hole in the ice tends to scatter fish which are near the area in which the hole is being drilled. Normally, at the conclusion of the day's fishing, the ice hole is left in an open condition. When the fisherman returns to the ice hole, the ice hole has become frozen which requires the necessity of again drilling a hole in the ice to enable the fisherman to resume fishing. Prior art ice hole fishing plugs have been provided which are inserted into the ice hole upon completion of fishing in an attempt to prevent the ice hole from freezing over until the fisherman returns after an absence. For example, U.S. Pat. No. 4,761,909 discloses an ice hole fishing plug which comprises an inflatable plug which is inserted into the ice hole and is then inflated. The ice plug of the '909 patent requires that a source of air under pressure be available to inflate the plug. Similarly, U.S. Pat. No. 3,999,322 discloses an inflatable ice fishing hole plug. U.S. Pat. No. 3,813,891 discloses a method and apparatus for preventing and retarding the freezing of an ice fishing hole including a buoyant housing including covers.

SUMMARY OF THE INVENTION

An ice fishing hole plug is provided for preventing the freezing of an ice fishing hole not in use. The plug comprises an elongated, cylindrical member having upper and lower ends and which is constructed of compressible and expandable closed cell waterproof foam material. The elongated rod extends through the cylindrical member and has its lower end secured to a plate which is positioned at the lower end of the cylindrical member. The upper end of the elongated rod extends upwardly through a plate positioned at the upper end of the cylindrical body and has a threaded portion at the upper end thereof. A collar or hub is secured to the plate at the upper end of the cylindrical member and receives the upper end of the elongated rod therein. A nut is threaded on the upper end of the elongated rod which, when threadably tightened with respect to the rod, causes the closed cell foam body to be squeezed between the upper and lower plates to cause the cylindrical member to expand in a radial direction against the side walls of the hole in the ice, thereby sealing the hole. A nut on the upper end of the elongated rod maybe tightened down on the rod or loosened upwardly therefrom by means of an actuator handle assembly which comprises the elongated rod extending downwardly through a hollow pipe which is selectively threadably secured to the hub as required. The lower end of the crank rod has a socket mounted thereon which is adapted to engage the nut on the upper end of the rod extending through the cylindrical member. The upper end of the crank rod has a handle portion thereof to facilitate rotation of the crank rod and socket. After the actuator assembly has been utilized to thread the nut downwardly on the upper end of the rod extending through the cylindrical member to expand the cylindrical member into engagement with the sides of the ice hole, the actuator is removed from the hub. A protective cover is removably secured to the hub to prevent snow and ice from accumulating in the interior of the hub. Preferably, the cover has a flag extending upwardly therefrom which will help the fisherman to locate the plug upon his/her return to the fishing hole. When the fisherman returns to the fishing hole, the cover is removed from the hub and the actuator assembly is used to threadably loosen the nut on the upper end of the rod extending through the cylindrical member to release the pressure of the plug against the walls of the ice hole. The plug is then raised from the ice hole to permit the fisherman to resume fishing. If the plug is slightly frozen in the ice hole, the fisherman may replace the cap on the hub and apply pressure downwardly on the cap, with his or her foot, to loosen the plug so that the plug may be removed from the fishing hole.

A principal object of the invention is to provide an improved ice hole fishing plug.

A further object of the invention is to provide an ice hole fishing plug which prevents the freezing of an ice fishing hole when not in use.

A further object of the invention is to provide an ice hole fishing plug which does not require the use of air pressure to expand the same into contact with the wall of the ice fishing hole.

Still another object of the invention is to provide an ice hole fishing plug which is convenient to use and transport.

Yet another object of the invention is to provide an ice hole fishing plug which includes a convenient means for expanding the plug into engagement with the walls of the ice fishing hole and to retract the same as required.

Yet another object of the invention is to provide an ice hole fishing plug which includes a signal flag to help the fisherman locate the ice hole fishing plug upon the fisherman's return to the fishing area.

Yet another object of the invention is to provide an ice hole fishing plug which is economical of manufacture and durable in use.

These and other objects will be apparent to those skilled in the art.

DESCRIPTION OF THE PREFERRED EMBODIMENT

Figure 1:
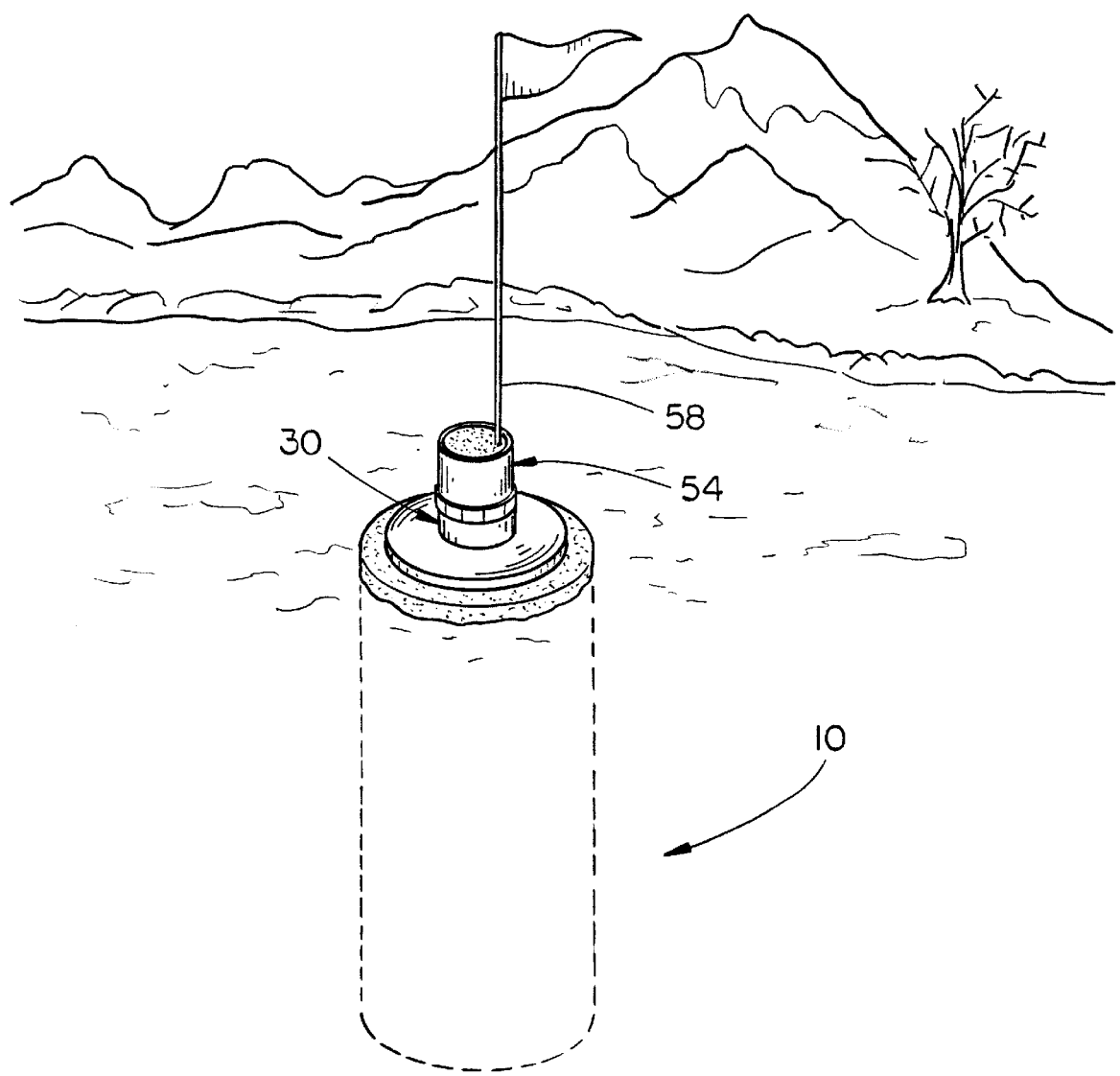
FIG. 1 illustrates the ice hole fishing plug of this invention positioned in an ice hole.
Figure 2:
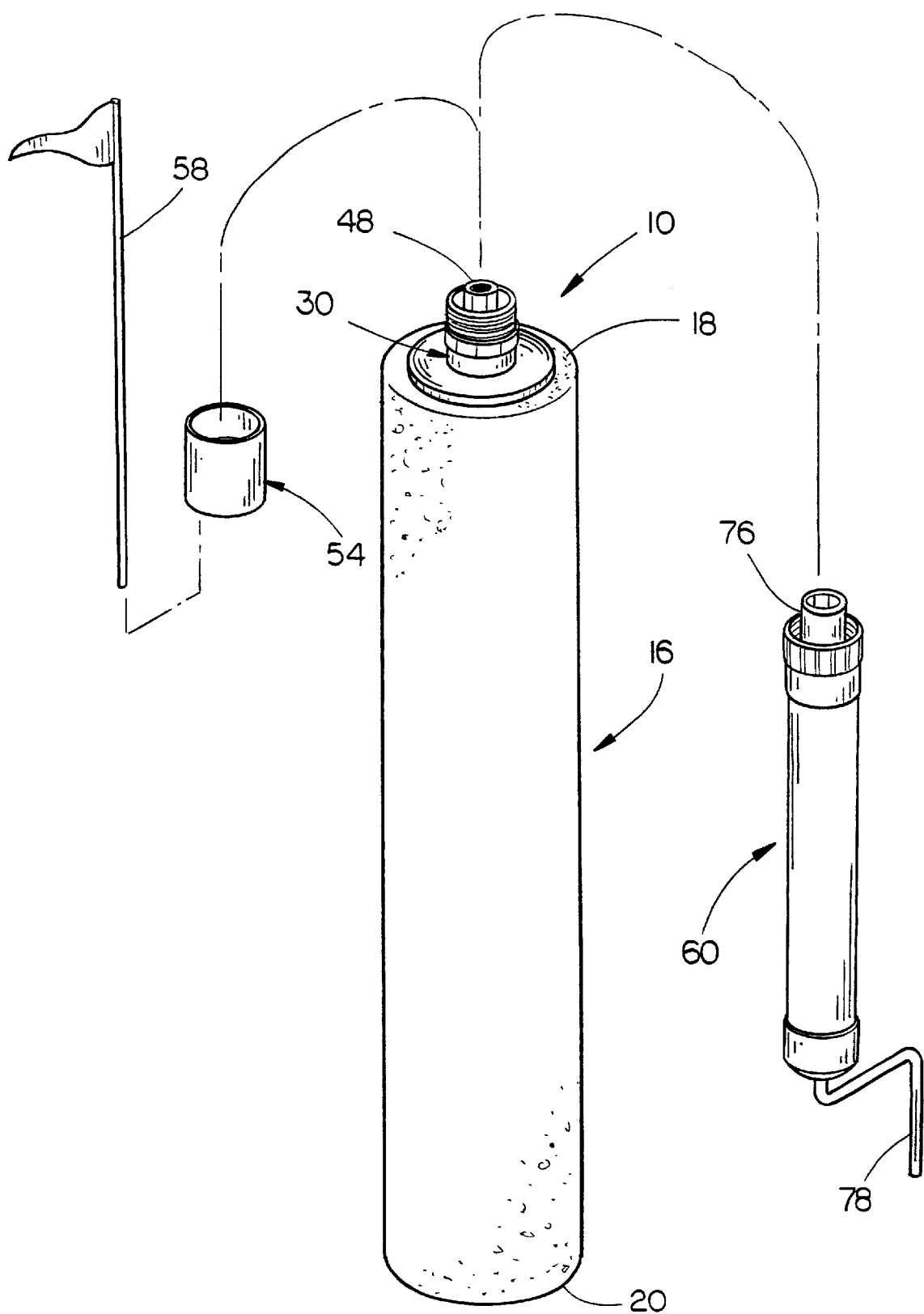
FIG. 2 is a perspective view of the plug and the actuator means associated therewith.

The ice hole fishing plug of this invention is referred to generally by the reference numeral 10. It is designed to be inserted into an ice hole 12 formed in the ice. For purposes of description, the ice hole 12 will be described as defining a cylindrical wall 14.

Plug 10 includes an elongated cylindrical member 16 having an upper end 18 and a lower end 20. Cylindrical member 16 is preferably comprised of a compressible and expandable closed foam material such as urethane or the like. An elongated opening 22 extends through the cylindrical member 16 between the upper and lower ends thereof. A disc-shaped plate 24 is positioned at the lower end of the cylindrical member 16 and has an opening 26 formed therein. A disc-shaped plate 28 is positioned adjacent the upper end of the cylindrical member 16 and has a hollow hub or collar 30 provided thereon which extends upwardly therefrom. Hub 30 may be integrally formed with plate 28 or may be a separate component if plate 28 is provided with an upstanding sleeve which could receive the lower end of the hub with the sleeve being secured to the hub. Opening 32 extends through hub 30 and plate 28, as seen in the drawings.

An elongated rod 34 extends through opening 22 of the cylindrical member 16 and has its upper end positioned above the upper end of the cylindrical member 16 and has its lower end positioned below the lower end of cylindrical member 16. The lower end of rod 34 is externally threaded at 36 and extends through opening 26 in plate 24. Washer 38 and nut 40 are mounted on the lower end of the rod 34 above plate 24. Washer 42 and nut 44 are mounted on the lower end of the rod 34 below plate 24. The nuts 40 and 44 secure the lower end of the rod 34 to the plate 24. Washer 46 and nut 48 are mounted on the upper end of the rod 34. As seen in the drawings, washer 46 is positioned in opening 32 of hub 30. Nut 48 is threadably mounted on the externally threaded portion 49 of rod 34.

Hub 30 has an externally threaded portion 52 at its upper end. When nut 48 is threaded downwardly on the rod 34, the cylindrical body 16 will be compressed between the plates 24 and 28 which will cause the cylindrical member 16 to expand outwardly in a radial manner into engagement with the side wall 14 of the fishing hole 12 as will be described in more detail hereinafter. The numeral 54 refers to a cap or cover which may be selectively mounted on the upper end of the hub 30 to prevent snow or ice from entering the upper interior of the hub 32 which could prevent access to the nut 48. Preferably, the upper end of cover 54 is provided with a non-skid surface 56. Preferably, flexible flag member 58 is secured to cover 54 and extends upwardly therefrom to assist the fisherman in locating the plug upon the fisherman's return to the fishing hole.

Figure 3:
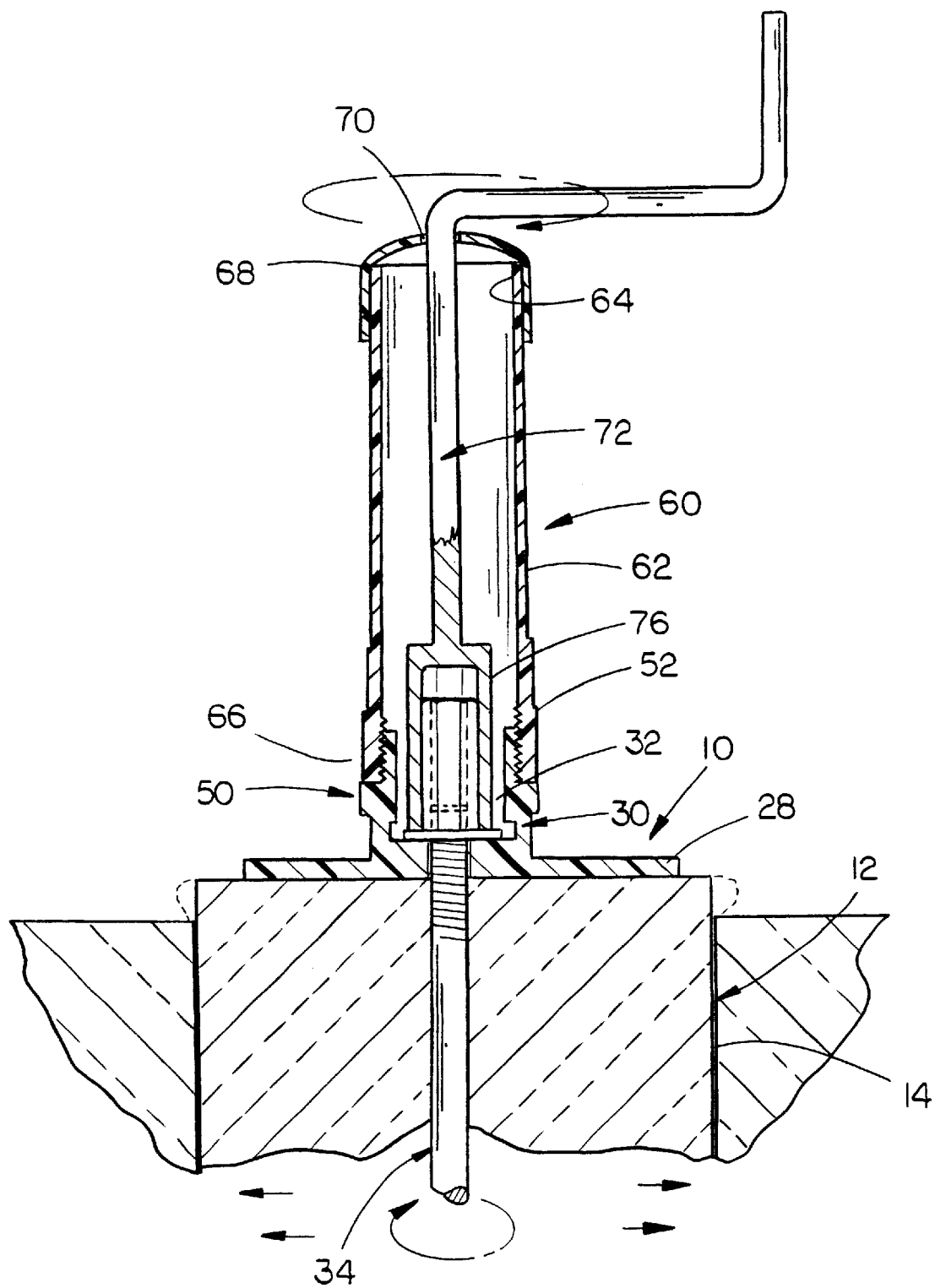
FIG. 3 is a partial vertical sectional view illustrating the plug being installed in the ice hole.
Figure 4:
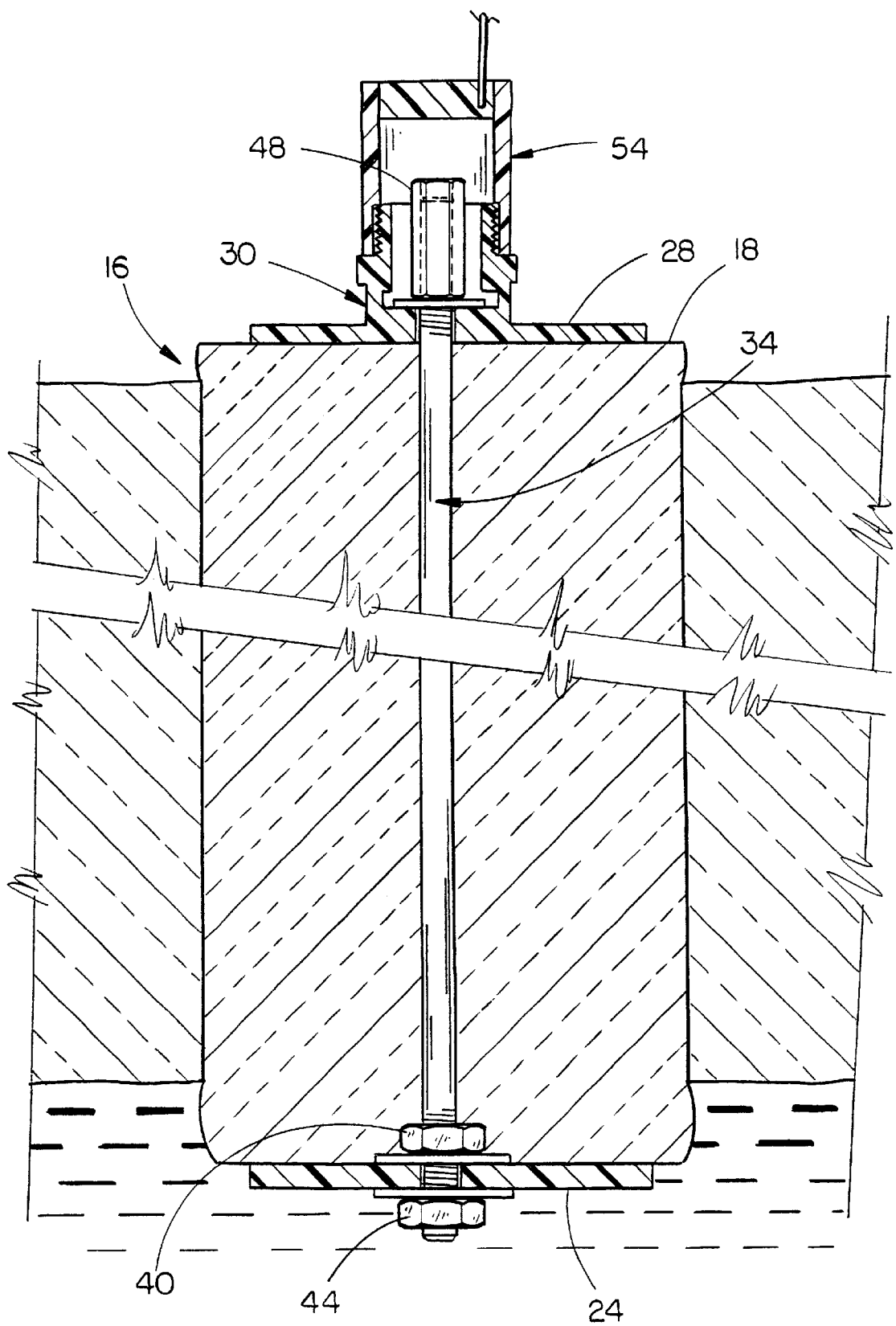
FIG. 4 is a partial sectional view illustrating the plug inserted in the ice hole.
Figure 5:
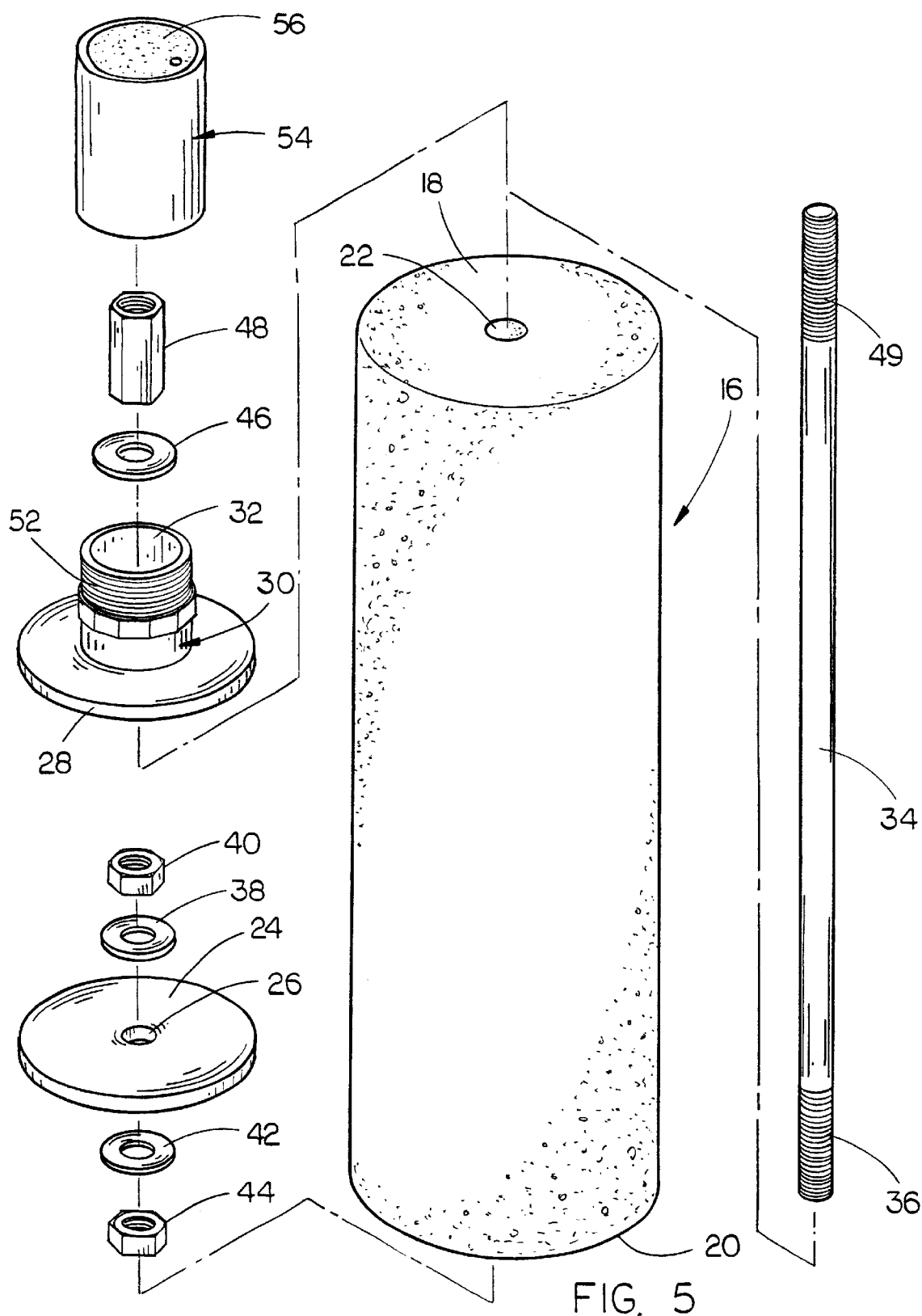
FIG. 5 is an exploded perspective view of the plug.
Figure 6:
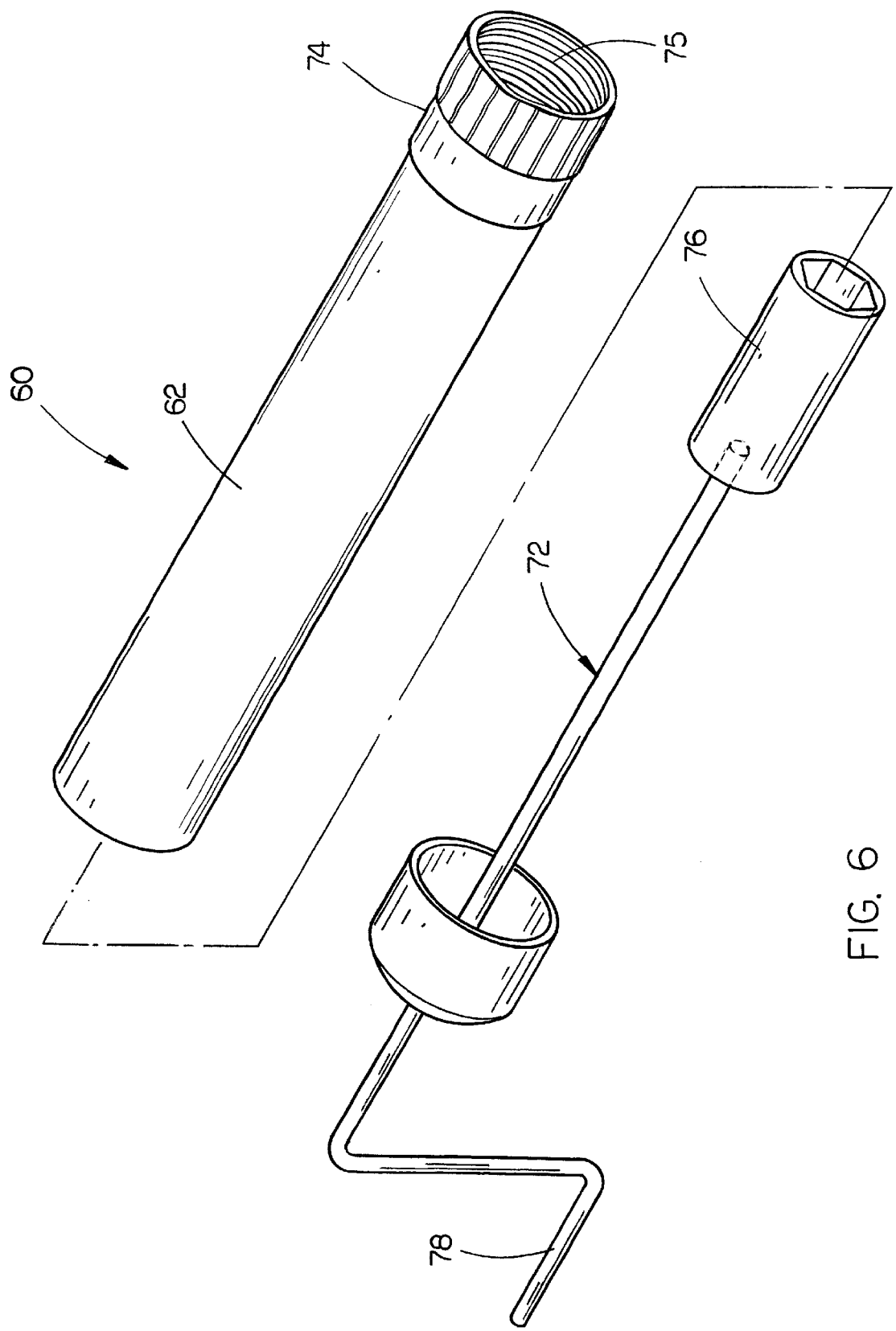
FIG. 6 is an exploded perspective view of the actuator for the plug.

FIGS. 3 and 6 illustrate a convenient means for threadably rotating nut 48 on the rod 34 to draw the plates 24 and 28 towards one another or permit the plates 24 and 28 to move away from one another. The actuator assembly of FIGS. 3 and 6 is referred to generally by the reference numeral 60 and includes an elongated hollow pipe 62 having an upper end 64 and a lower end 66. Cap 68 is mounted on the upper end of pipe 62 and has an opening 70 extending therethrough which rotatably receives crank rod 72 extending therethrough. The lower end of crank rod 72 extends through a collar 74 which is mounted on the lower end of pipe 62 and which has an internally threaded lower end 75 adapted to the threadably mounted on the externally threaded portion 52 of hub 30. The lower end of crank rod 72 has a socket 76 mounted thereon which is adapted to receive the nut 48. Handle 78 is provided at the upper end of the crank rod 72.

When it is desired to plug the fishing hole 12 during periods of non-use, the plug 10 is inserted downwardly into the ice hole 12 until the upper end of the cylindrical member 16 is positioned slightly above the upper surface of the ice, as seen in FIG. 3. The actuator assembly 60 is then positioned relative to the plug 10 so that the internally threaded lower end 75 of collar 74 maybe threadably mounted on the externally threaded portion 52 of hub 50. Crank rod 72 is then lowered relative to the hub 50 so that socket 76 moves into engagement with nut 48. Crank rod 72 is then rotated in a clockwise direction to thread the nut 48 downwardly on the rod 34 which causes the plates 24 and 28 to be drawn toward one another thereby compressing the cylindrical member 16 therebetween which causes the cylindrical member 16 to be compressed along its longitudinal axis to cause it to expand in a radial direction against the side wall 14 of the ice hole 12. When the cylindrical member 16 has been sufficiently moved into engagement with the side wall 14 of the ice hole 12, the actuator assembly 50 is removed from the hub 52. At that time, the cover 54 is mounted on the hub 52 with the flag 58 extending upwardly therefrom to assist the fisherman in locating the plug upon the fisherman's return to the fishing hole.

When the fisherman does return to the fishing hole, the cover 54 is removed from the hub 52 and the actuator assembly 50 is again mounted on the hub 52 with the socket 76 being in engagement with the nut 48. The crank rod 52 is rotated in a counterclockwise direction to threadably move the nut 46 upwardly on rod 34 which permits the cylindrical member 16 to assume its non-expanded condition. The plug 60 may then be removed from the hole 12 by lifting upwardly on the crank rod 72. If the plug 10 is slightly frozen in the ice hole 12, the actuator assembly 60 may be removed from the hub 50. The cover 54 is then mounted on the hub 50 and the fisherman may step downwardly on the non-skid surface 56 of the cover 54 to loosen the plug 10 within the ice hole 12. When the plug 10 has been loosened, the cover 54 is removed from the hub 50 and the actuator assembly 60 may then be reinstalled on the hub 50 to enable the fisherman to pull the plug 10 upwardly from the ice hole 12.

The use of the plug 10 eliminates the fisherman from having to drill another hole in the ice thereby reducing the likelihood that the fish in the vicinity of the ice hole 12 will be scattered which would normally occur when an ice auger is used to create the ice hole 12. The plug 10 is lightweight and is easy to transport and is extremely durable.

Thus it can be seen that the ice hole fishing plug of this invention accomplishes at least all of its stated objectives.

I claim:
1. An ice hole fishing plug for installation in an ice hole, comprising:
    an elongated, cylindrical member having upper and lower ends;
    said cylindrical member being comprised of a compressible material and being adapted to be inserted in the ice hole;
    an elongated rod, having upper and lower ends, extending through said cylindrical member so that its said lower end is positioned at the said lower end of said cylindrical member and so that its said upper end is positioned at said upper end of said cylindrical member;
    said upper end of said rod having a threaded portion;
    a lower plate positioned at said lower end of said cylindrical member;
    said lower end of said rod being operatively secured to said lower plate;
    an upper plate positioned at said upper end of said cylindrical member, wherein a hollow collar is provided on said upper plate and wherein said upper end of said rod extends upwardly through said upper plate and into said hollow collar;

said upper end of said rod extending through said upper plate;

a nut means threadably mounted on said threaded portion of said rod above said upper plate;

a hollow pipe having lower and upper ends; said lower end of said pipe being selectively secured to said hollow collar and extending upwardly therefrom; an elongated crank rod extending through said pipe and having upper and lower ends; said lower end of said crank rod having a socket thereof adapted to engage and receive said nut means therein; and a crank handle on the upper end of said crank rod for facilitating the rotation of said crank rod and said nut means;

the threadable tightening of said nut means, after said cylindrical member has been positioned in the ice hole, causing the diameter of said cylindrical member to be increased so as to be drawn into engagement with the wall of the ice hole to temporarily plug the ice hole.

2. The ice hole fishing plug of claim 1 wherein said lower end of said pipe is selectively threadably secured to said collar.

* * * * *